United States Patent
Van Swearingen et al.

(10) Patent No.: US 8,887,379 B2
(45) Date of Patent: Nov. 18, 2014

(54) FRICTION WELD COAXIAL CONNECTOR INTERCONNECTION SUPPORT

(71) Applicant: Andrew LLC, Hickory, NC (US)

(72) Inventors: Kendrick Van Swearingen, Woodridge, IL (US); Ronald Alan Vaccaro, Shorewood, IL (US); James P Fleming, Orland Park, IL (US)

(73) Assignee: Andrew LLC, Hickory, NC (US)

( * ) Notice: Subject to any disclaimer, the term of this patent is extended or adjusted under 35 U.S.C. 154(b) by 0 days.

(21) Appl. No.: 13/889,592

(22) Filed: May 8, 2013

(65) Prior Publication Data

US 2013/0252463 A1    Sep. 26, 2013

Related U.S. Application Data

(60) Division of application No. 13/644,081, filed on Oct. 3, 2012, now Pat. No. 8,479,383, which is a continuation-in-part of application No. 12/962,943, filed on Dec. 8, 2010, now Pat. No. 8,302,296, which is a continuation-in-part of application No. 12/951,558, filed on Nov. 22, 2010, now Pat. No. 8,826,525.

(51) Int. Cl.
| | |
|---|---|
| H01R 43/00 | (2006.01) |
| H01R 4/02 | (2006.01) |
| B23K 20/12 | (2006.01) |
| H01R 9/05 | (2006.01) |
| H01R 43/02 | (2006.01) |
| H01R 43/20 | (2006.01) |

(52) U.S. Cl.
CPC ............... *H01R 4/029* (2013.01); *B23K 20/129* (2013.01); *H01R 9/05* (2013.01); *H01R 43/0207* (2013.01); *H01R 43/20* (2013.01); *B23K 2201/38* (2013.01)
USPC .................... 29/748; 29/747; 29/745; 29/729; 29/700; 29/753; 439/578; 439/583; 439/584; 439/429

(58) Field of Classification Search
CPC ........ B23K 20/129; H01R 43/20; H01R 9/05; H01R 43/0207; H01R 4/029
USPC ........... 29/748, 747, 745, 729, 700, 753, 857; 439/578, 583, 584, 429
See application file for complete search history.

(56) References Cited

U.S. PATENT DOCUMENTS

| 3,778,531 A | 12/1973 | Higgins |
|---|---|---|
| 4,746,305 A | 5/1988 | Nomura |

(Continued)

FOREIGN PATENT DOCUMENTS

EP     1001496     5/2000

OTHER PUBLICATIONS

Sung Hee Kim, International Search Report from related PCT filing PCT/US/2011/046049, Seo-Gu, Daejeon, Republic of South Korea, Feb. 9, 2012.

*Primary Examiner* — Peter DungBa Vo
*Assistant Examiner* — Azm Parvez
(74) *Attorney, Agent, or Firm* — Babcock IP, PLLC (57) ABSTRACT

A coaxial connector for interconnection with a coaxial cable with a solid outer conductor by friction welding is provided with a monolithic connector body with a bore dimensioned for an interference fit with an outer diameter of the outer conductor. A friction groove may be formed around the leading end of the outer conductor by application of a friction weld support against the inner diameter and leading end of the outer conductor. The friction groove may include a material chamber formed between a radial friction protrusion of the bore and a bottom of the friction groove. The friction weld support may be provided with ceramic surfaces contacting the outer conductor, a stop shoulder dimensioned to abut a cable end of the bore and/or an elastic insert seated within an inner conductor bore.

4 Claims, 12 Drawing Sheets

(56) References Cited

U.S. PATENT DOCUMENTS

| | | |
|---|---|---|
| 5,046,952 A | 9/1991 | Cohen et al. |
| 5,186,644 A | 2/1993 | Pawlicki et al. |
| 5,299,939 A | 4/1994 | Walker et al. |
| 5,354,217 A | 10/1994 | Gabel et al. |
| 5,561,900 A | 10/1996 | Hosler, Sr. |
| 5,823,824 A | 10/1998 | Mitamura et al. |
| 6,471,545 B1 | 10/2002 | Hosler, Sr. |
| 6,607,399 B2 | 8/2003 | Endo et al. |
| 6,752,668 B2 | 6/2004 | Koch, Jr. |
| 6,793,095 B1 | 9/2004 | Dulisse et al. |
| 6,814,625 B2 | 11/2004 | Richmond et al. |
| 6,932,644 B1 | 8/2005 | Taylor |
| 7,044,785 B2 | 5/2006 | Harwath et al. |
| 7,144,274 B2 | 12/2006 | Taylor |
| 7,217,154 B2 | 5/2007 | Harwath |
| 7,465,190 B2 * | 12/2008 | Henningsen .......... 439/578 |
| 7,520,779 B2 | 4/2009 | Arnaud et al. |
| 7,607,942 B1 | 10/2009 | Van Swearingen |
| 7,753,727 B1 | 7/2010 | Islam et al. |
| 8,002,580 B2 | 8/2011 | Huixiong et al. |
| 2010/0130060 A1 | 5/2010 | Islam |
| 2012/0064764 A1 | 3/2012 | Islam |
| 2012/0129383 A1 | 5/2012 | Van Swearingen |
| 2012/0129384 A1 | 5/2012 | Van Swearingen |
| 2012/0129391 A1 | 5/2012 | Van Swearingen |

* cited by examiner

FRICTION WELD COAXIAL CONNECTOR INTERCONNECTION SUPPORT

BACKGROUND

1. Field of the Invention

This invention relates to electrical cable connectors. More particularly, the invention relates to a coaxial cable connector interconnectable via friction welding.

2. Description of Related Art

Coaxial cable connectors are used, for example, in communication systems requiring a high level of precision and reliability.

To create a secure mechanical and optimized electrical interconnection between the cable and the connector, it is desirable to have generally uniform, circumferential contact between a leading edge of the coaxial cable outer conductor and the connector body. A flared end of the outer conductor may be clamped against an annular wedge surface of the connector body via a coupling body. Representative of this technology is commonly owned U.S. Pat. No. 6,793,529 issued Sep. 21, 2004 to Buenz. Although this type of connector is typically removable/re-useable, manufacturing and installation is complicated by the multiple separate internal elements required, interconnecting threads and related environmental seals.

Connectors configured for permanent interconnection via solder and/or adhesive interconnection are also well known in the art. Representative of this technology is commonly owned U.S. Pat. No. 5,802,710 issued Sep. 8, 1998 to Bufanda et al. However, solder and/or adhesive interconnections may be difficult to apply with high levels of quality control, resulting in interconnections that may be less than satisfactory, for example when exposed to vibration and/or corrosion over time.

Competition in the coaxial cable connector market has focused attention on improving electrical performance and long term reliability of the cable to connector interconnection. Further, reduction of overall costs, including materials, training and installation costs, is a significant factor for commercial success.

Therefore, it is an object of the invention to provide a coaxial connector and method of interconnection that overcomes deficiencies in the prior art.

BRIEF DESCRIPTION OF THE DRAWINGS

The accompanying drawings, which are incorporated in and constitute a part of this specification, illustrate embodiments of the invention, where like reference numbers in the drawing figures refer to the same feature or element and may not be described in detail for every drawing figure in which they appear and, together with a general description of the invention given above, and the detailed description of the embodiments given below, serve to explain the principles of the invention.

DETAILED DESCRIPTION

Aluminum has been applied as a cost-effective alternative to copper for the conductors in coaxial cables. However, aluminum oxide surface coatings quickly form upon air-exposed aluminum surfaces. These aluminum oxide surface coatings may degrade traditional mechanical, solder and/or conductive adhesive interconnections.

The inventors have recognized that increasing acceptance of coaxial cable with solid outer conductors of aluminum and/or aluminum alloy enables connectors configured for interconnection via friction welding between the outer conductor and a connector body which may also be cost effectively provided, for example, formed from aluminum and/or aluminum alloy.

Figure 1:
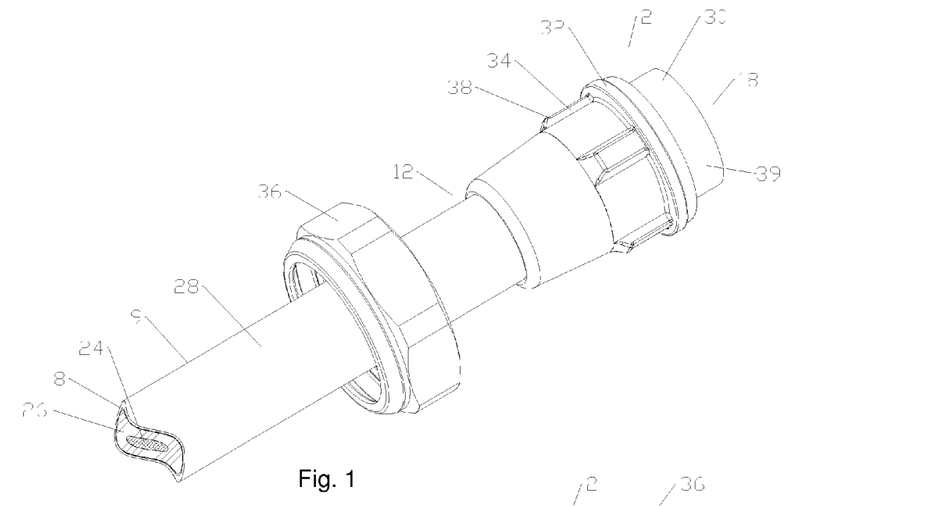
FIG. 1 is a schematic external isometric view of an exemplary embodiment of a coaxial connector installed upon a coaxial cable with a coupling nut spaced away from the connector along the cable for connector-to-cable interconnection.
Figure 2:
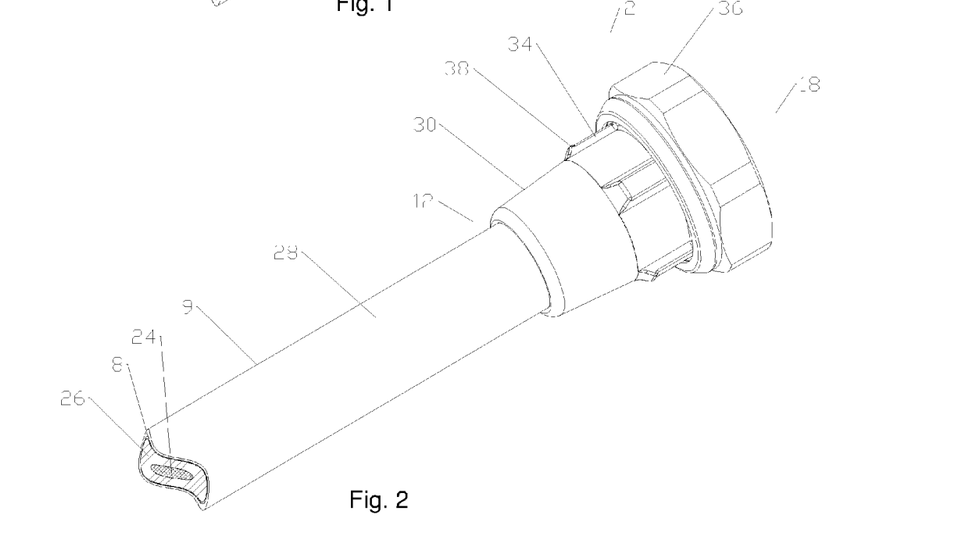
FIG. 2 is a schematic isometric view of the coaxial connector of FIG. 1 installed upon a coaxial cable, with the coupling nut seated upon the coaxial connector.
Figure 3:
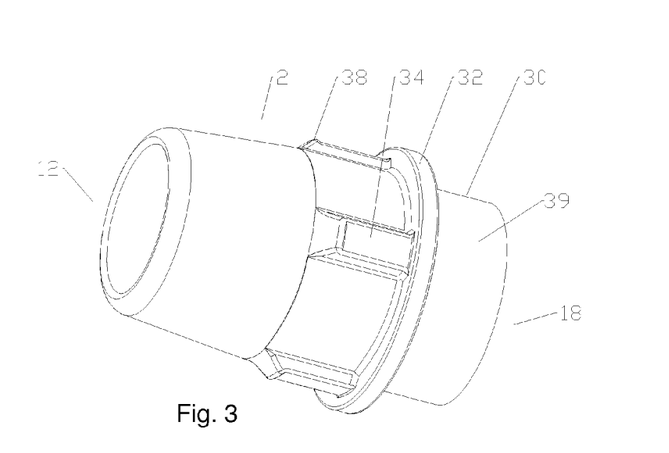
FIG. 3 is a schematic isometric view of the coaxial connector of FIG. 1.
Figure 4:
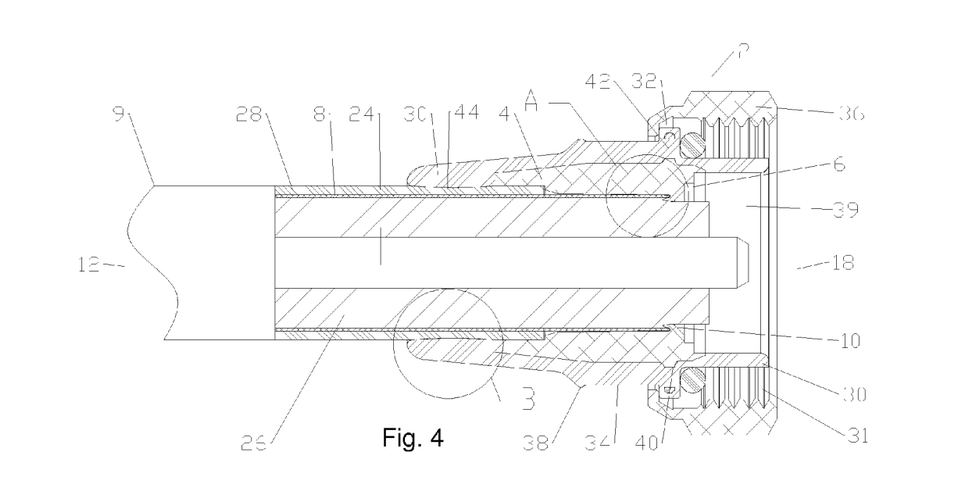
FIG. 4 is a schematic cross section side view of FIG. 2.
Figure 5:
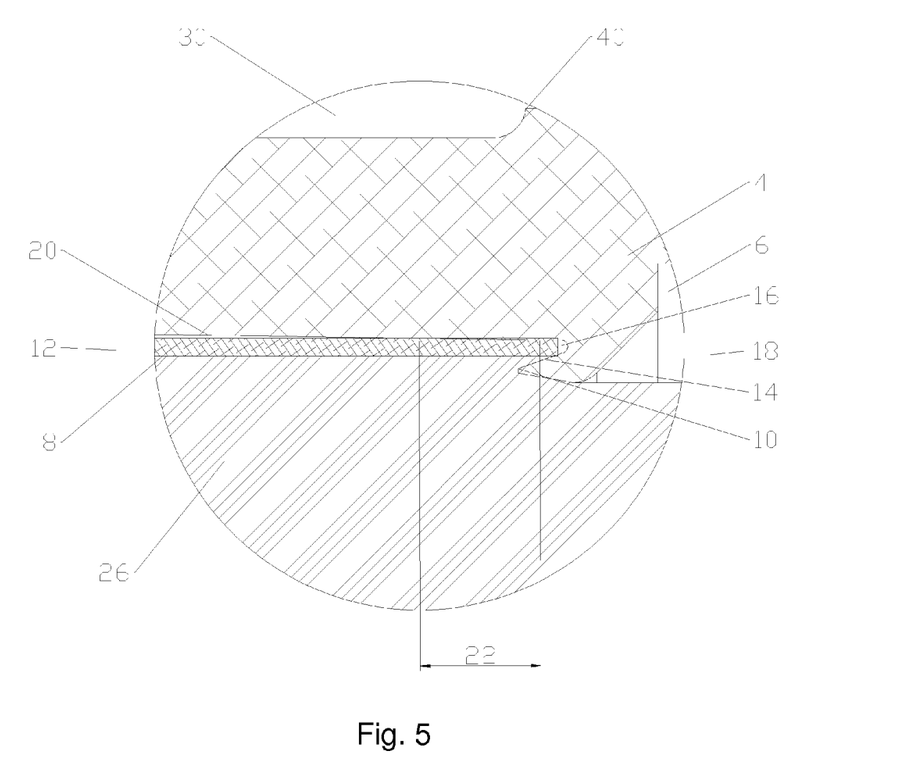
FIG. 5 is an enlarged view of area A of FIG. 4.

An exemplary embodiment of a friction weldable coaxial connector 2 is demonstrated in FIGS. 1-4. As best shown in FIG. 4, a unitary connector body 4 is provided with a bore 6 dimensioned to receive the outer conductor 8 of a coaxial cable 9 therein. An inward projecting shoulder 10 angled toward a cable end 12 of the connector body 4 forms an annular friction groove 14 open to the cable end 12. As best shown in FIG. 5, the friction groove 14 is dimensioned to receive a leading edge of the outer conductor 8 therein, a thickness of the outer conductor 8 preventing the outer conductor 8 from initially bottoming in the friction groove 14, forming an annular material chamber 16 between the leading edge of the outer conductor 8 and the bottom of the friction groove 14, when the outer conductor 8 is initially seated within the friction groove 14.

One skilled in the art will appreciate that connector end 18 and cable end 12 are applied herein as identifiers for respective ends of both the connector and also of discrete elements of the connector described herein, to identify same and their respective interconnecting surfaces according to their alignment along a longitudinal axis of the connector between a connector end 18 and a cable end 12.

The bore sidewall 20 may be diametrically dimensioned to create a friction portion 22 proximate the friction groove 14. The friction portion 22 creates additional interference between the bore sidewall 20 and the outer diameter of the outer conductor 8, to increase friction during friction welding.

Figure 6:
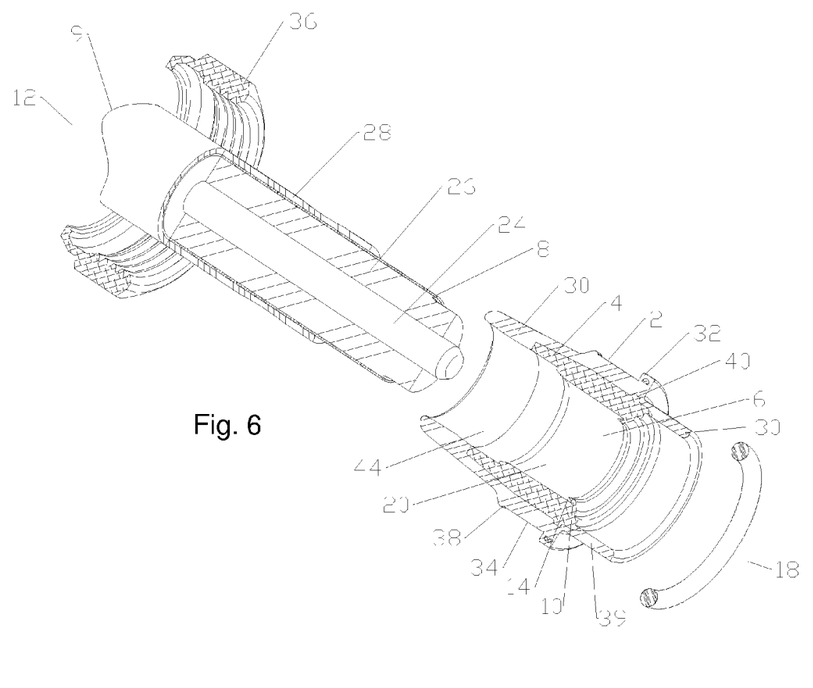
FIG. 6 is a schematic exploded isometric partial cut-away view of the connector and cable of FIG. 1.

Prior to interconnection via friction welding, also known as spin welding, the cable end 12 may be prepared, as best shown in FIG. 6, by cutting the cable 9 so that the inner conductor 24 extends from the outer conductor 8. Also, dielectric material 26 between the inner conductor 24 and outer conductor 8 may be stripped back and a length of the outer jacket 28 removed to expose desired lengths of each, including a sacrificial portion of the outer conductor 8 which is consumed during the friction welding process.

To initiate friction welding, the connector body 4 is rotated with respect to the outer conductor 8 during seating of the leading edge of the outer conductor 8 within the friction portion 22 and into the friction groove 14, under longitudinal pressure. During rotation, for example at a speed of 3000 to 5000 revolutions per minute, the friction between the leading edge and/or outer diameter of the outer conductor 8 and the friction portion 22 and/or friction groove 14 of the bore 6 generate sufficient heat to soften the leading edge and/or localized adjacent portions of the outer conductor 8 and connector body 4, forging them together as the sacrificial portion of the outer conductor 8 forms a plastic weld bead that flows into the material chamber 16 to fuse the outer conductor 8 and connector body 4 together.

Figure 15:
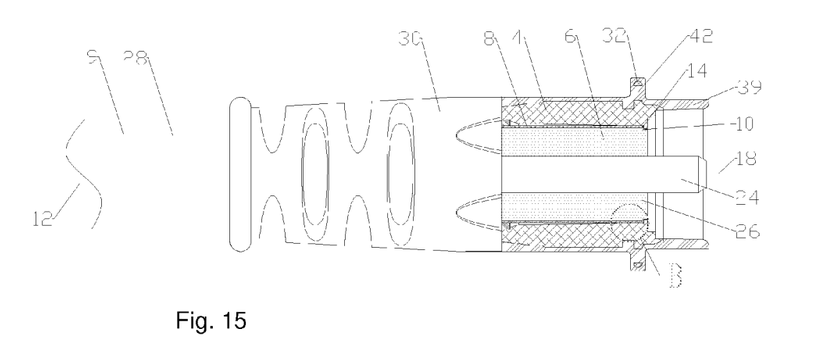
FIG. 15 is a schematic cross section side view of an alternative coaxial connector embodiment with a minimally extending shoulder.
Figure 16:
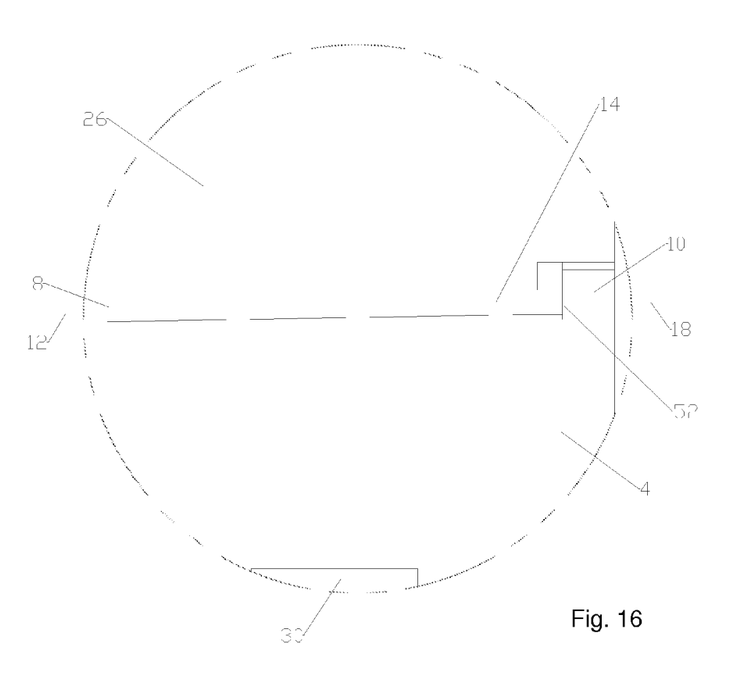
FIG. 16 is an enlarged view of area B of FIG. 15.
Figure 17:
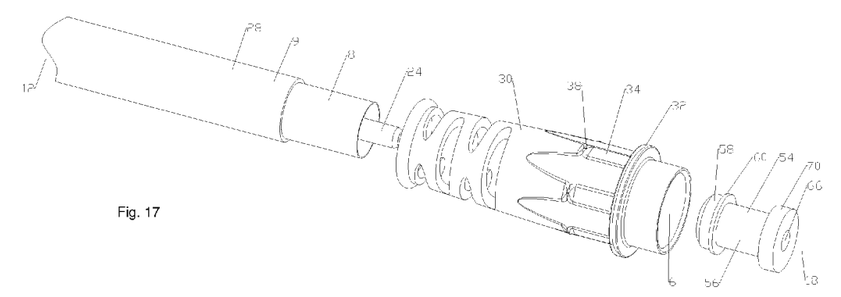
FIG. 17 is a schematic exploded view of an alternative coaxial connector embodiment with a friction weld support.

Projection of the shoulder 10 into the signal space between the outer conductor 8 and the inner conductor 24 (see FIG. 5) may generate an impedance discontinuity that degrades electrical performance. Such impedance discontinuities may be minimized by reducing the structure of the friction groove 14 to the bore sidewall 20 and a friction groove bottom 52 by applying an inward projecting shoulder 10 with limited overhang and/or extent less than an inner diameter of the outer conductor 8, for example as shown in FIGS. 15 and 16. However, this may require that the outer conductor 8 have a significantly increased thickness, material strength characteristics and/or an outer conductor 8 supporting dielectric material 26 with high temperature resistance, to avoid inward deformation and/or collapse of the outer conductor 8 during friction welding.

Alternatively, a friction weld support 54 may be applied during the friction welding, for example as shown in FIGS. 17-21. The friction weld support 54 has an insert body 56 with a generally cylindrical insert portion 58 provided at the cable end 12 with an outer diameter dimensioned to seat within and thereby support the inner diameter of the outer conductor 8. The travel of the insert portion 58 within the inner diameter of the outer conductor 8 may be limited, when the outer conductor 8 is seated within the bore 6, by a stop shoulder 60 at a connector end 18 of the insert portion 58 that abuts a connector end 18 of the bore 6 when the insert portion 58 is fully seated within the inner diameter of the leading edge of the outer conductor 8.

Figure 21:
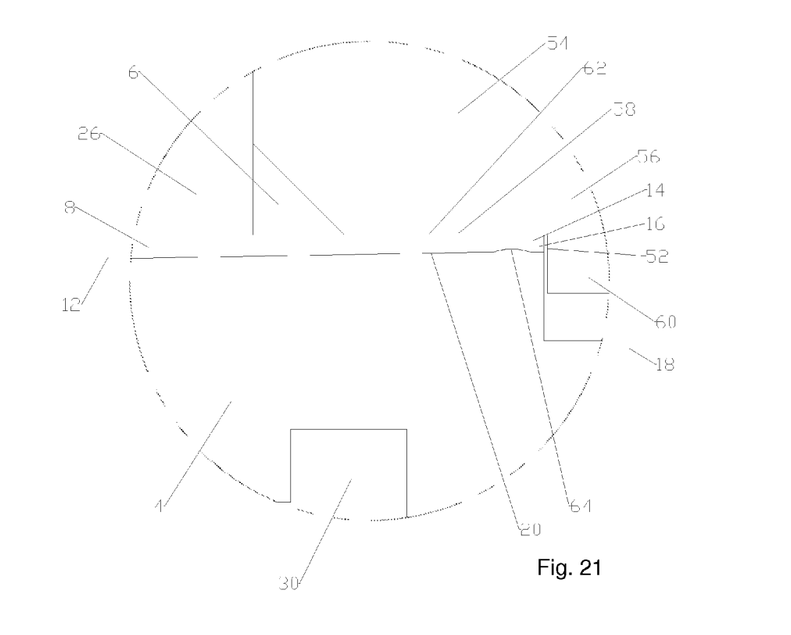
FIG. 21 is an enlarged view of area A of FIG. 20.

As best shown in FIG. 21, inserted within the inner diameter of the outer conductor 8 seated within the bore 6, the friction weld support 54 provides an inner sidewall 62 and/or friction groove bottom 52 of an outer conductor leading edge friction groove 14, retaining the outer conductor 8 against the bore sidewall 20 as described herein above. However, after friction welding has been completed, the friction weld support 54 may be extracted, leaving a weld between the outer conductor 8 and connector body 4, without structure projecting into the signal space.

To further enhance friction with the bore sidewall 20, the bore 6 may be dimensioned with a progressive interference fit tapered to a minimum inner diameter towards the connector end 18, as best shown in FIG. 21. A final inward projecting interference protrusion 64 may be applied proximate the connector end 18 of the bore 6 to define a material chamber 16 between the interference protrusion 64 and the friction groove bottom 52 to enable molten intermingling of the sacrificial material at the leading edge of the outer conductor and the bore sidewall 20 during friction welding.

To minimize friction between the friction weld support 54 and the outer conductor 8, at least the insert portion 58 of the friction weld support 54 may be provided as a low friction heat resistant material such as ceramic material. Alternatively, the entire friction weld support 54 may be formed from the selected low friction heat resistant material. Thereby, the friction weld support 54 may have friction and thermal damage resistance characteristics as well as limited dimensional variation during friction welding, enabling repeated use of a single friction weld support 54 with multiple interconnections.

To avoid interference with the inner conductor 24, the insert body 56 may be provided with an inner conductor bore 66, coaxial with the insertion portion 58. A diameter of the inner conductor bore 66 is greater than an outer diameter of an inner conductor. An elastic insert 68 may also be provided, seated within the inner conductor bore 66 to maintain the position of the friction weld support 54 during apparatus assembly for friction welding, as shown for example in FIG. 20.

An extraction shoulder 70 may be provided proximate a connector end 18 of the insert body 56 for ease of insertion/extraction before and after friction welding.

Friction welding utilizing the friction weld support 54 may apply additional steps to the procedure described herein above. For example, the dielectric material 26 may be stripped back from the leading end of the outer conductor 8, within the cable 9, to provide space for the insertion of the friction weld support 54 such that, when the leading edge of the outer conductor 8 is seated within the friction groove 14, the friction weld support 54 does not contact the dielectric material 26.

During the friction weld step, the friction weld support 54 may be alternatively rotationally locked with either the connector body 4 or the cable 9. Further, the longitudinal force applied during the friction welding may be applied via the friction weld support 54, as the stop shoulder 60 will abut the connector body 4 at a connector end 18 of the bore 6, driving the connector body 4 ahead of it towards the leading end of the outer conductor 8.

Figure 18:
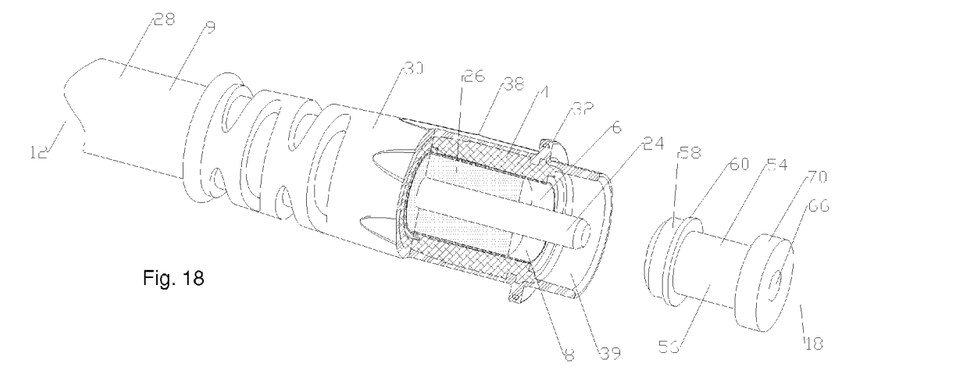
FIG. 18 is a schematic isometric partial cut-away view of the alternative coaxial connector of FIG. 17, with the coaxial cable positioned in the bore, ready for insertion of the friction weld support.
Figure 19:
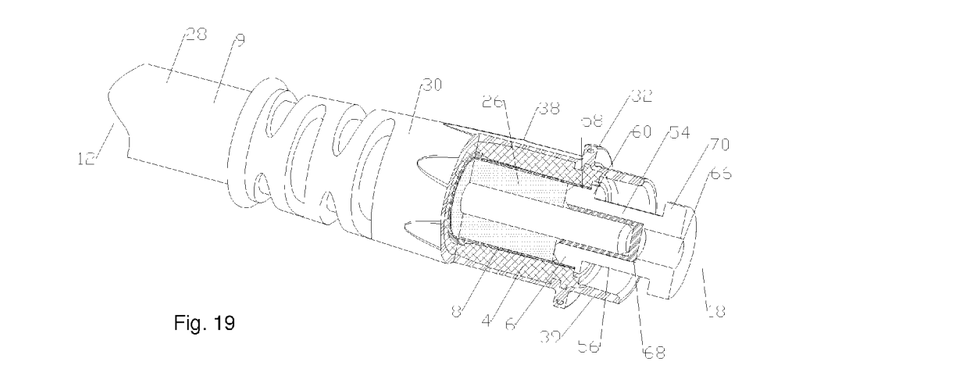
FIG. 19 is a schematic isometric partial cut-away view of the alternative coaxial connector of FIG. 17, with the friction weld support seated within the bore, ready for initiation of friction weld rotation.
Figure 20:
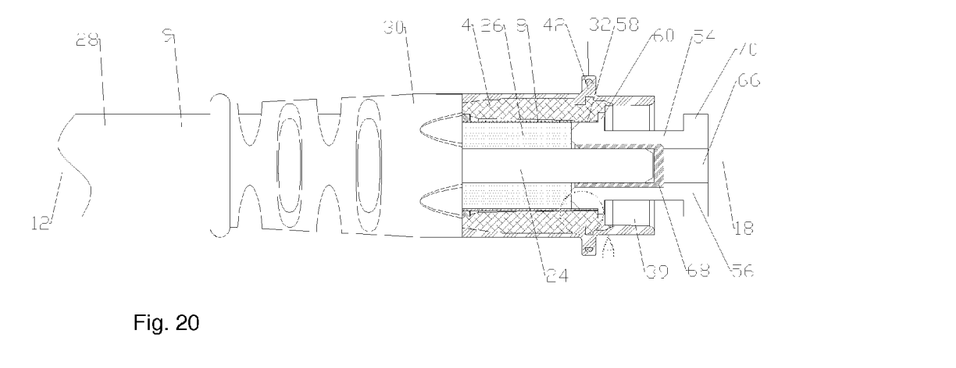
FIG. 20 is a schematic side view of FIG. 19.

The ready for rotation assembly wherein the leading edge of the outer conductor 8 is seated within the friction groove 14, formed by the combination of the connector body 4 and the friction weld support 54, may be assembled for the friction welding in an order best suited to the characteristics of the outer conductor 8 utilized. For example, where the outer conductor 8 is fragile, the outer conductor 8 may be inserted within the bore 6 prior to seating of the friction weld support 54 within the bore 6 and against the inner diameter of the outer conductor 8, for example as shown in FIG. 18. Then, the friction weld support 54 may be inserted within the bore 6 and inner diameter of the outer conductor 8, the bore 6 supporting the outer conductor 8 from collapse as the friction weld support 54 is inserted, for example as shown in FIG. 19. Alternatively, the friction weld support 54 may be inserted within the bore 6 before the leading edge of the outer conductor 8 is inserted directly into the combined friction groove 14 formed thereby.

Because the localized abrasion of the friction welding process can break up any aluminum oxide surface coatings in the immediate weld area, no additional care may be required with respect to removing or otherwise managing the presence of aluminum oxide on the interconnection surfaces.

Figure 10:
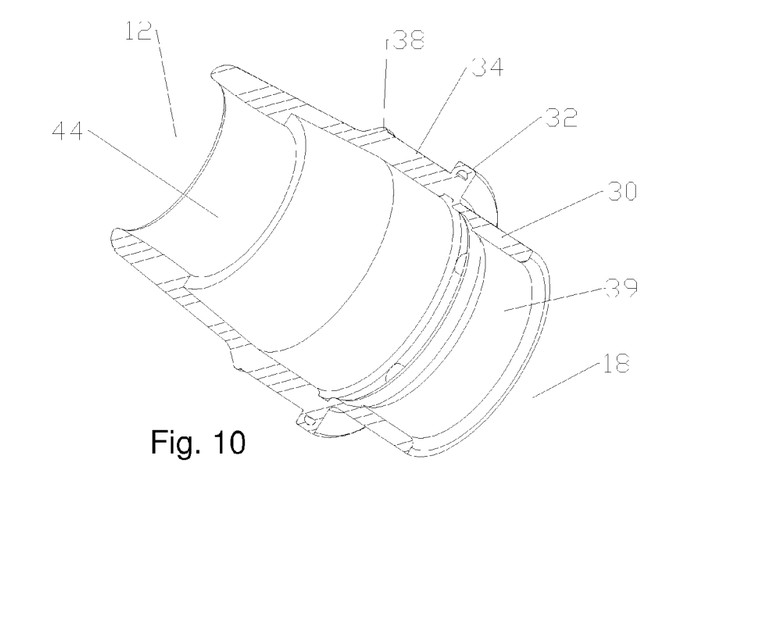
FIG. 10 is a schematic isometric cut-away view of the overbody of FIG. 5.

An overbody 30, as shown for example in FIG. 10, may be applied to the connector body 4 as an overmolding of polymeric material. The overbody 30 increases cable to connector torsion and pull resistance. The overbody 30 may also provide connection interface structure at the connector end 18 and further reinforcing support at the cable end 12, enabling significant reductions in the size of the connector body 4, thereby reducing overall material costs.

Depending upon the applied connection interface 31, demonstrated in the exemplary embodiments herein as a standard 7/16 DIN interface, the overbody 30 may be provided with an overbody flange 32 and longitudinal support ridges 34 for a coupling nut 36. The coupling nut 36 is retained upon the support ridges 34 at the connector end 18 by an overbody flange 32 and at the cable end 12 by a retention spur 38 provided on at least one of the support ridges 34. The retention spur 38 may be angled toward the connector end 18, allowing the coupling nut 36 to be placed over the cable 9 initially spaced away from the coaxial connector 2 during interconnection (see FIG. 1), but then allowing the coupling nut 36 to be passed over the retention spur 38 and onto the support ridges 34 from the cable end 12, to be thereafter retained upon the support ridges 34 by the retention spur(s) 38 (see FIG. 2) in close proximity to the connector interface 31 for connector to connector mating. The support ridges 34 reduce polymeric material requirements of the overbody 30 while providing lateral strength to the connector/interconnection 2 as well as alignment and retention of the coupling nut 36.

The overbody 30 may also extend from the connector end 18 of the connector body 4 to provide portions of the selected connector interface 31, such as an alignment cylinder 39 of the 7/16 DIN interface, further reducing metal material requirements of the connector body 4.

Figure 7:
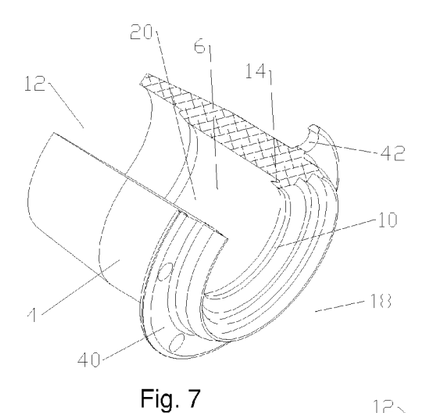
FIG. 7 is a schematic isometric partial cut-away view of the connector body of FIG. 5.
Figure 8:
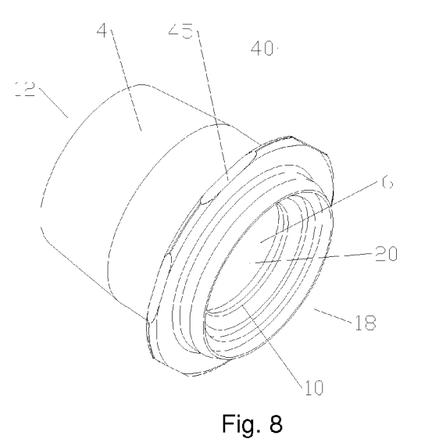
FIG. 8 is a schematic isometric view of an alternative connector body with notches on a flange of the connector body.
Figure 9:
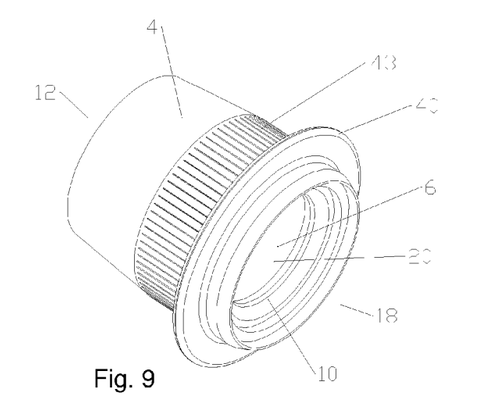
FIG. 9 is a schematic isometric view of an alternative connector body with longitudinal knurls on the connector body outer diameter.

The overbody flange 32 may be securely keyed to a connector body flange 40 of the connector body 4 and thereby with the connector body 4 via one or more interlock apertures 42 such as holes, longitudinal knurls 43, grooves, notches 45 or the like provided in the connector body flange 40 and/or outer diameter of the connector body 4, as demonstrated in FIGS. 7-9. Thereby, as the polymeric material of the overbody 30 flows into the interlock apertures 42 during overmolding, upon curing the overbody 30, for example as shown in FIG. 10, is permanently coupled to and rotationally interlocked with the connector body 4.

Figure 11:
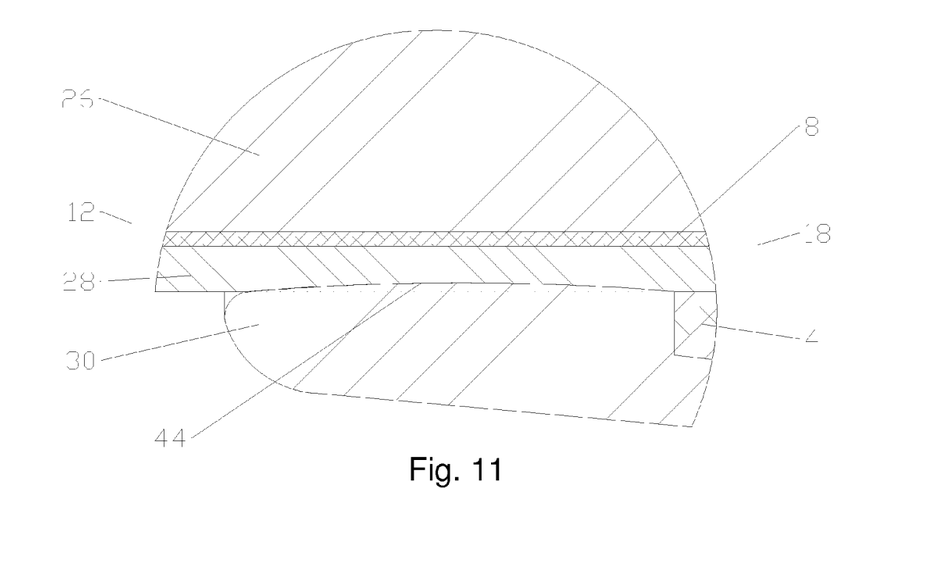
FIG. 11 is an enlarged view of area B of FIG. 4.
Figure 12:
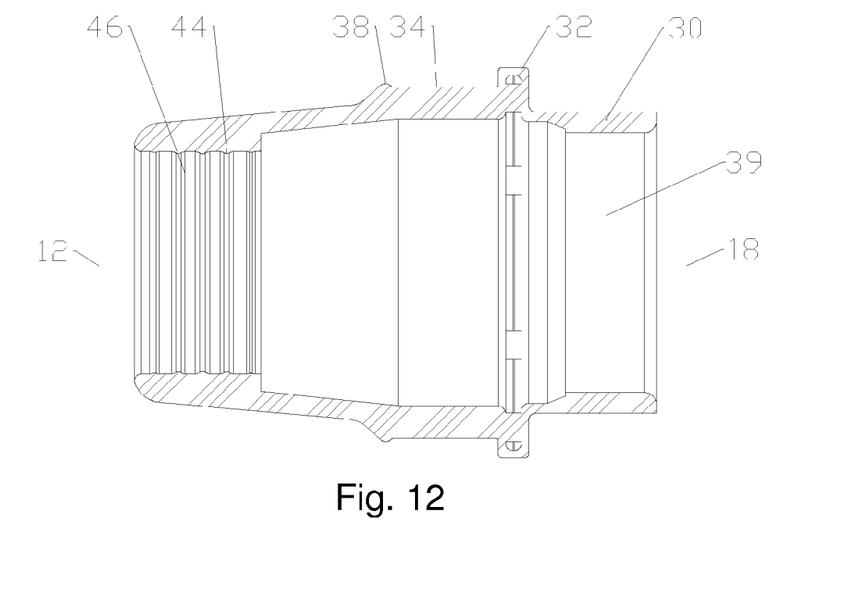
FIG. 12 is a schematic cross section side view of an alternative overbody with corrugation on an inner diameter of the cable end.
Figure 13:
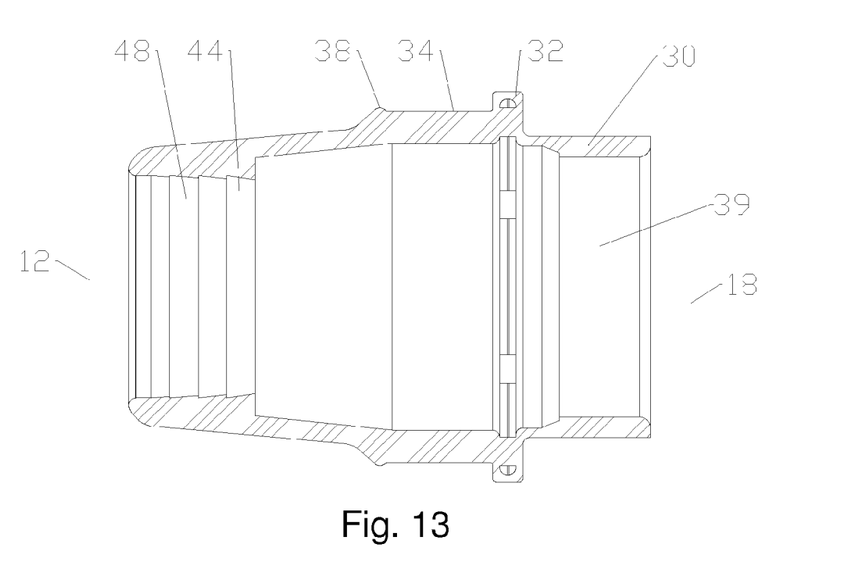
FIG. 13 is a schematic cross section side view of an alternative overbody with a stepped surface on an inner diameter of the cable end.

As best shown in FIG. 11, the cable end 12 of the overbody 30 may be dimensioned with an inner diameter friction surface 44 proximate that of the coaxial cable outer jacket 28, enabling polymeric friction welding between the overbody 30 and the outer jacket 28, as the connector body 4 and outer conductor, thereby eliminating the need for environmental seals at the cable end 12 of the connector/cable interconnection. During friction welding, the coaxial connector 2 is rotated with respect to the cable 9. Friction between the friction surface 44 and the outer diameter of the outer jacket 28 heats the respective surfaces to a point where they begin to soften and intermingle, sealing them against one another. To provide enhanced friction and allow voids for excess flow due to friction displacement and add key locking for additional strength, the outer jacket 28 and/or the inner diameter of the overbody 30 may be provided as a series of spaced apart annular peaks of a contour pattern such as a corrugation 46, as shown for example in FIG. 12, or a stepped surface 48, as shown for example in FIG. 13. Alternatively, the overbody 30 may be sealed against the outer jacket 28 with an adhesive/sealant or may be overmolded upon the connector body 4 after interconnection with the outer conductor 8, the heat of the injected polymeric material bonding the overbody 30 with and/or sealing against the outer jacket 28.

The inner conductor 24 extending from the prepared end of the coaxial cable 9 may be selected to pass through to the connector end 18 as a portion of the selected connection interface 31, for example as shown in FIG. 4. If the selected coaxial cable 9 has an inner conductor 24 that has a larger diameter than the inner conductor portion of the selected connector interface 31, the inner conductor 24 may be ground at the connector end 18 to the required diameter.

Figure 14:
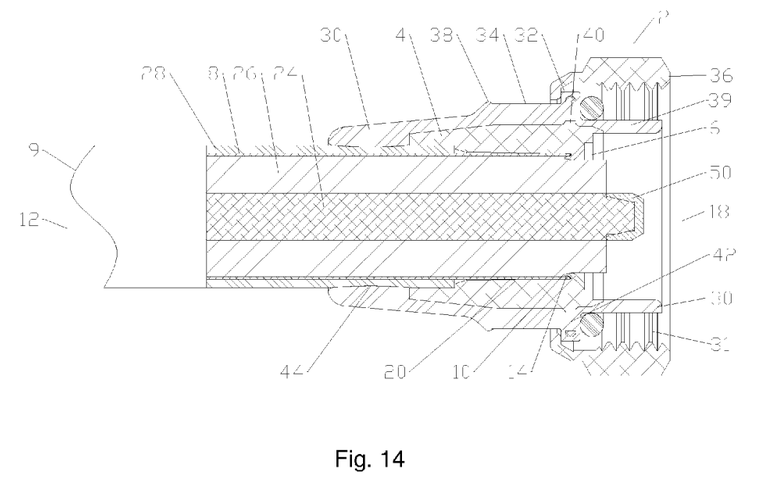
FIG. 14 is a schematic cross section side view of a coaxial connector embodiment with an inner conductor end cap.

Although a direct pass through inner conductor 24 advantageously eliminates interconnections, for example with the spring basket of a traditional coaxial connector inner contact, such structure may introduce electrical performance degradation such as PIM. Where the inner conductor 24 is also aluminum material some applications may require a non-aluminum material connection point at the inner contact/inner conductor of the connection interface 31. As shown for example in FIG. 14, a center cap 50, for example formed from a metal such as brass or other desired metal, may be applied to the end of the inner conductor 24, also by laser or friction welding. To apply the center cap 50, the end of the inner conductor 24 is ground to provide a pin corresponding to the selected socket geometry of the center cap 50. To allow material inter-flow during welding attachment, the socket geometry of the center cap 50 and or the end of the inner conductor 24 may be formed to provide material gaps as described with respect to the material chamber 16 described herein above.

One skilled in the art will appreciate that the connector and interconnection method disclosed has significant material cost efficiencies and provides a permanently sealed interconnection with reduced size and/or weight requirements.

| Table of Parts | |
|---|---|
| 2 | coaxial connector |
| 4 | connector body |
| 6 | bore |
| 8 | outer conductor |
| 9 | cable |
| 10 | shoulder |
| 12 | cable end |
| 14 | friction groove |
| 16 | material chamber |
| 18 | connector end |
| 20 | bore sidewall |
| 22 | friction portion |
| 24 | inner conductor |
| 26 | dielectric material |
| 28 | outer jacket |
| 30 | overbody |
| 31 | connection interface |
| 32 | overbody flange |

-continued

Table of Parts

| | |
|---|---|
| 34 | support ridge |
| 36 | coupling nut |
| 38 | retention spur |
| 39 | alignment cylinder |
| 40 | connector body flange |
| 42 | interlock aperture |
| 43 | longitudinal knurl |
| 44 | friction surface |
| 45 | notch |
| 46 | corrugation |
| 48 | stepped surface |
| 50 | center cap |
| 52 | friction groove bottom |
| 54 | friction weld support |
| 56 | insert body |
| 58 | insert portion |
| 60 | stop shoulder |
| 62 | inner sidewall |
| 64 | interference protrusion |
| 66 | inner conductor bore |
| 68 | elastic insert |
| 70 | extraction shoulder |

Where in the foregoing description reference has been made to materials, ratios, integers or components having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

We claim:

1. A friction weld support for friction welding a coaxial connector with a solid outer conductor coaxial cable; comprising:
    an insert body with a cable end insert portion with an outer diameter dimensioned to seat within an inner diameter of the outer conductor;
    the insertion portion is ceramic material;
    the insert body provided with a stop shoulder at a connector end of the insert portion; the stop shoulder dimensioned to abut a connector end of a bore of a connector body of the coaxial connector;
    the insert portion operative as an inner sidewall of an annular friction groove formed upon insertion of a leading end of the outer conductor into the bore and insertion of the insert portion into the inner diameter of the outer conductor, the stop shoulder abutting the connector end of the bore.

2. The support of claim 1, further including an extraction shoulder proximate a connector end of the insert body.

3. The support of claim 1, further including an inner conductor bore in the insert body, coaxial with the insertion portion; a diameter of the inner conductor bore greater than an outer diameter of an inner conductor of the coaxial cable.

4. The support of claim 3, further including an elastic insert, seated within the inner conductor bore.

* * * * *